United States Patent
Kennedy et al.

(10) Patent No.: US 6,528,584 B2
(45) Date of Patent: Mar. 4, 2003

(54) MULTI-COMPONENT POLYMERIC NETWORKS CONTAINING POLY (ETHYLENE GLYCOL)

(75) Inventors: Joseph P. Kennedy, Akron, OH (US); Pious V. Kurian, Akron, OH (US)

(73) Assignee: The University of Akron, Akron, OH (US)

( * ) Notice: Subject to any disclaimer, the term of this patent is extended or adjusted under 35 U.S.C. 154(b) by 21 days.

(21) Appl. No.: 09/833,774

(22) Filed: Apr. 12, 2001

(65) Prior Publication Data

US 2003/0022991 A1 Jan. 30, 2003

(51) Int. Cl.[7] .......................... C08L 83/12; C08L 83/06; C08G 77/46
(52) U.S. Cl. ...................... 525/101; 525/100; 525/106; 525/474; 525/478; 525/479; 528/25; 528/29; 528/31; 528/32
(58) Field of Search ................................ 525/100, 101, 525/106, 474, 478, 479; 528/25, 29, 31, 32; 424/422, 486

(56) References Cited

U.S. PATENT DOCUMENTS

| 3,957,843 | A | * | 5/1976 | Bennett | 521/111 |
|---|---|---|---|---|---|
| 4,486,572 | A | | 12/1984 | Kennedy | 525/283 |
| 4,942,204 | A | | 7/1990 | Kennedy | 525/293 |
| 5,073,381 | A | | 12/1991 | Ivan et al. | 424/487 |
| 5,112,512 | A | * | 5/1992 | Nakamura | 252/500 |
| 5,169,906 | A | * | 12/1992 | Cray et al. | 525/453 |
| 5,807,944 | A | | 9/1998 | Hirt et al. | 526/279 |
| 6,005,051 | A | | 12/1999 | Kennedy et al. | 525/106 |
| 6,300,452 | B1 | * | 10/2001 | Jukarainen et al. | 528/15 |

OTHER PUBLICATIONS

*Journal of Macromolecular Science*, Chemistry Edition, vol. A21, No. 3, pp. 319–334 (1984).
U.S. patent application Ser. No. 09/433,660 entitled "Amphiphilic Networks, Implantable Immunoisolatory Devices, and Method of Preparation".

* cited by examiner

*Primary Examiner*—Robert Dawson
*Assistant Examiner*—Jeffrey B. Robertson
(74) *Attorney, Agent, or Firm*—Renner, Kenner Greive, Bobak Taylor & Weber (57) ABSTRACT

Multicomponent networks or membranes of the present invention have good mechanical properties that are permeable to water, hydrocarbons, and oxygen. The networks contain at least two and preferably at least three covalently combined domains, i.e., a hydrophilic, a lipophilic and an oxyphilic polymer segment, that give rise to a multicontinuous domain microstructure. At least one of these domains includes poly(ethylene glycol).

16 Claims, 2 Drawing Sheets

MULTI-COMPONENT POLYMERIC NETWORKS CONTAINING POLY (ETHYLENE GLYCOL)

This invention disclosed in this application was at least partially supported by the National Science Foundation under Grant No. 99-88808. The U.S. Government may have certain rights to the invention herein.

TECHNICAL FIELD

This invention relates generally to multiple component polymeric compositions, and, more particularly, to multi-component networks or membranes containing hydrophilic, lipophilic and oxyphilic segments or domains, wherein at least one of the segments include poly(ethylene glycol).

BACKGROUND OF THE INVENTION

Many medical deficiencies and diseases result from the inability of an individual's cells to produce normal biologically active moieties. Many of these deficiencies can be remedied by providing an exogenous source of needed biologically active moieties or pharmacological agents to the individual having the deficiency. A well known example of a disease that can be remedied by providing an exogenous source of a biological material or pharmacological agent is Type I diabetes mellitus, wherein the production of insulin by pancreatic Langerhans islets is substantially deficient, impaired or completely lost.

Advances in cell and tissue engineering has also led to the development of bioartificial organs as potential approaches for ameliorating a variety of these medical deficiencies. Progress made in biomaterial research over the past several years has indicated that synthetic organic polymers may be the future of artificial organ research. For instance, using the Type I diabetes example above, encapsulation of human islet cells or tissues within a biologically compatible (biocompatible) device, such as a reservoir or physical barrier, followed by implantation of the device within an individual has been proposed to deliver biological material to an individual to treat Type I diabetes and other disease states.

While hundreds of different polymer structures exist, only a few are the focus of biomaterials research. This is because, while many polymers may approximate some of the properties required for use as artificial organs, most are not ideal in that they lack the combination of properties needed. For example, silicone rubber is a well known material used in medicine because of its inert behavior, transparency and flexibility. But for certain applications, e.g., for use as a tracheal prostheses, a hydrophilic surface is required, and silicone rubber is not hydrophilic. Similarly, in the Type I diabetes example, the immune response of the host and, consequently, the graft rejection of biological materials such as cells, tissues and organs, has severely limited the use of implantation of many materials into individuals. The biomaterials employed to contain the foreign cells must be at least amphiphilic, in other words permeable to water and to hydrocarbons, but must not let the immune response of the host destroy the cells or tissues therein.

Heretofore, amphiphilic polymer networks have been targeted as potential materials that may be useful for implantation of biologically active moieties. Such amphiphilic polymer networks are random, co-continuous assemblages of hydrophilic and hydrophobic polymer chains that are able to swell in both hydrophilic solvents (e.g., water) and hydrophobic solvents (e.g., a liquid hydrocarbon). Because these materials swell in water, they generally fall into a class of compounds known as "hydrogels".

The first amphiphilic membranes for biomaterials were developed over a decade ago with the advent of living carbocationic polymerzation. The syntheses of these polyisobutylene-based amphiphilic networks were accomplished by the free radical copolymerization of a variety of inexpensive, commercially available monomers (e.g., N-dimethylaminoethyl methacrylate, dimethyl acrylamide) that gave hydrophilic polymers with the hydrophobic crosslinking agent, di-methacryl-telechelic polyisobutylene (MA-PIB-MA). A more detailed discussion on amphiphilic networks may be found in Keszler and Kennedy, *Journal of Macromolecular Science,* Chemistry Edition, Vol. A21, No. 3, pages 319–334 (1984), the disclosure of which is incorporated herein by reference.

Continued research in the area led to the development of other PIB-based amphiphilic networks, many of which are implantable and quite similar in use to controlled drug-release devices. They both must be bioinvisible, must have controlled pore sizes, must allow the diffusion of desirable well-defined molecules, must be sterilizable, and must have robust mechanical properties for implantation, use and retrieval.

For example, Kennedy, U.S. Pat. No. 4,486,572 discloses the synthesis of styryl-telechelic polyisobutylene and amphiphilic networks comprising the copolymerization product of the styryl-telechelic polyisobutylene with vinyl acetate or N-vinyl-2-pyrollidone. Kennedy, U.S. Pat. No 4,942,204 discloses an amphiphilic copolymer network swellable in both water and n-heptane but insoluble in either, comprising the reaction product of an acrylate or methacrylate of a dialkylaminoalkyl with a hydrophobic bifunctional acryloyl or methacryloyl capped polyolefin. The preferred embodiment disclosed is an amphiphilic network having been synthesized by the free-radical copolymerization of a linear hydrophobic acrylate (A-PIB-A) or methacrylate capped polyisobutylene (MA-PIB-MA) with 2-(dimethylamino)ethyl methacrylate (DMAEMA). In a continuation-in-part to U.S. Pat. No. 4,942,204, Ivan et al. U.S. Pat. No. 5,073,381 discloses various amphiphilic copolymer networks that are swellable in water and n-heptane that comprise the reaction product of a hydrophobic linear acryloyl- or methacryloyl- capped polyolefin and a hydrophilic polyacrylate or polymethacrylate, such as N,N-dimethylacrylamide (DMAAm) and 2-hydroxyethylmethyl methacrylate (HEMA).

In addition, Hirt, U.S. Pat. No. 5,807,944 discloses an amphiphilic segmented copolymer of controlled morphology comprising at least one oxygen permeable polymer segment and at least one ion permeable polymer segment, wherein the oxygen permeable segments and the ion permeable segments are linked together through a non-hydrolyzable bond. The oxygen-permeable polymer segments are selected from polysiloxanes, perfluoroalkyl ethers, polysulfones, and other unsaturated polymers. The ion permeable polymers are selected from cyclic imino ethers, vinyl ethers, cyclic ethers, including epoxides, cyclic unsaturated ethers, N-substituted aziridines, β-lactones, β-lactanes, ketene acetates, vinyl acetates and phosphoranes.

More recently, U.S. application Ser. No. 09/433,660, owned by the assignee of record, has disclosed an amphiphilic network comprising the reaction product of hydrophobic crosslinking agents and hydrophilic monomers wherein the hydrophobic crosslinking agents are telechelic three-arm polyisobutylenes having acrylate or methacrylate end caps and wherein the hydrophilic monomers are acrylate or methacrylate derivatives.

However, while amphiphilic networks provide the necessary hydrophilic and hydrophobic components necessary to conceive suitable biomaterials and devices, there are other areas where the biomaterials or membranes produced from the amphiphilic networks were not suitable. For instance, while the amphiphilic networks of the prior art are, in most instances, permeable to water and hydrocarbons, they are not highly permeable to oxygen.

It is, therefore, believed desirable in the art to develop networks and/or implantable biological devices that have superior immunoisolatory properties, superior mechanical properties, and are biocompatible, hemocompatible, and exhibit excellent biostability when placed into a host for extended periods of time, and which are hydrophilic, lipophilic and oxyphilic (hereinafter "triphilic").

The multiple component networks (MCNs) of the present invention should be distinguished from more traditional interpenetrating polymer networks (IPNs). An MCN is defined as a single elastomeric network comprising at least two chemically different covalently-bonded sequences; whereas, an IPN consists of two or more unlinked, independent networks. The distinction is significant because the polymers in the IPNs are not linked chemically; instead, they are two separate networks tangled within one another. The distinction between MCNs and IPNs is more particularly set forth schematically hereinbelow, wherein the networks are bicomponent networks.

Traditionally, MCNs require that the two or more crosslinked components contribute to the physical and chemical characteristics of the polymeric networks. To that end, it will be appreciated that bicomponent networks have chains consisting of two chemically different moieties, while tricomponent networks have chains consisting of three chemically different moieties. The properties of the multicomponent networks will reflect those of its individual components.

Bicomponent networks are known in the art. Earlier inventions showed that polyisobutylene (PIB) in combination with various other segments, including polydimethyl siloxane (PDMS), methacrylate and siloxane, and hydrophilic acrylates, leads to biocompatible materials and even amphiphilic networks. Others have synthesized PIB-PEG networks via isocynate chemistry. However, almost all of the development relating to bicomponent networks has been based upon the carbocationic polymerization of polyisobutylene. Moreover, while bicomponent networks are known, there is little, if any, information relating to tricomponent/ tricontinuous networks in the literature.

Thus, it is also believed desirable to synthesize semipermeable, biocompatible and immunisolatory membranes which are not limited to polyisobutylene-based chemistry, but yet retain the triphilic characteristics and mechanical properties desired of such membranes.

At present, there are many compounds that could be useful as biocompatible segments in multicomponent networks. For example, poly(ethylene glycol) (PEG) is a water soluble polymer showing excellent biocompatibility and has been frequently used in biomedical applications. Similarly, polysiloxanes are widely used in the biomedical field and have been the subject of intense study both in the academic field as well as in industry.

Heretofore, however, there has been little, if any, study of these or other compounds for use in amphiphilic networks or other multicomponent networks without PIB.

BRIEF SUMMARY OF THE INVENTION

It is, therefore, an aspect of the present invention to provide a multicomponent network of at least two chemically different components or segments covalently bonded together.

It is another aspect of the present invention to provide a multicomponent network, as above, wherein at least one of the segments is poly(ethylene glycol).

It is still another aspect of the present invention to provide a multicomponent network, as above, which is triphilic, i.e., hydrophilic, lipophilic, and oxyphilic.

It is yet another aspect of the present invention to provide a multicomponent network, as above, wherein the network is biocompatible and has excellent immunoisolatory properties, excellent mechanical properties, and excellent biostability.

It is a further aspect of the present invention to provide a tricomponent/tricontinuous network or membrane.

It is still a further aspect of the present invention to provide a tricomponent/tricontinuous network, as above, that is at least amphiphilic.

It is yet a further aspect of the present invention to provide a tricomponent/tricontinuous network, as above, which is triphilic.

At least one or more of the foregoing, together with the advantages thereof over the known art relating to polymeric networks, which shall become apparent from the specification which follows, are accomplished by the invention as hereinafter described and claimed.

In general, one or more aspects of the present invention may be accomplished by a multi-component network comprising the reaction product of at least a plurality of multifunctional, allyl terminated polyethylene glycols linked to a plurality of multifunctional siloxane compounds having at least two (2) SiH moieties for each siloxane compound.

One or more other aspects of the present invention may be accomplished by a multicomponent network comprising the hydrosilation reaction product of a plurality of ditelechelic, allyl-terminated polyethylene glycols, a plurality of ditelechelic, allyl-terminated polyisobutylenes, and a plurality of ditelechelic vinyl-terminated polydimethylsiloxanes, each linked to a plurality of pentamethylcyclopentasiloxanes having five SiH moieties for each of the pentamethylcyclopentasiloxanes.

DETAILED DESCRIPTION OF THE INVENTION

The present invention is directed toward the synthesis of polymeric compositions, namely multicomponent networks (MCNs), containing a plurality of multifunctional poly(ethylene glycol) (PEG) segments and a plurality of at least one other multifunctional compound, covalently bonded to the PEG segments. In the various embodiments preferred for the present invention, these MCNs may be bicomponent networks, meaning only two chemically different segments are covalently bonded together. Or they may be tricomponent networks, meaning three or more chemically different segments are covalently bonded together. In any of these embodiments however, it will be understood that at least one of the segments is PEG, and more preferably, PEG whose precursor was an allyl-telechelic PEG. Moreover, at least one of the other of the segments is a multifunctional compound having a plurality of SiH groups. Thus, the invention takes advantage of the known hydrosilation reaction to endlink the two or more different allyl-terminated or vinyl-terminated polymer moieties using a crosslinking compound containing the SiH groups, such as pentamethylcyclopentasiloxane ($D_5H$), wherein the crosslinking agent has five (5) SiH groups.

As noted, the multicomponent networks of the present invention are unique in that they require at least one segment to be PEG, but it should also be noted that the networks do not necessarily require another of the segments to be PIB. That is, the multicomponent networks of the present invention are PEG-based and may be devoid of any PIB segments, something not previously accomplished in prior work.

In one embodiment, the multicomponent network was made of ditelechelic, allyl-terminated PEG (A-PEG-A), ditelechelic allyl-terminated polyisobutylene (A-PIB-A), and ditelechelic vinyl-terminated polydimethylsiloxane (V-PDMS-V) crosslinked with siloxane molecules having at least two SiH moieties (preferably $D_5H$) as the crosslinking agent so as to provide a useful polymeric composition which is triphilic in nature. That is, the PEG segment is known to be hydrophilic, the PIB segment is known to be hydrophobic and lipophilic, and the PDMS segment, as well as the $D_5H$ crosslinking segment are oxyphilic and lipophilic. This multicomponent, tricontinuous network comprises three (or four, depending upon whether one makes a distinction between PDMS and $D_5H$) chemically different covalently bonded segments consisting of hydrophilic, lipophilic and oxyphilic domains.

To synthesize such a multicomponent network, appropriate polymer segments must be covalently combined. In this invention, A-PEG-A and A-PIB-A were selected. For example, α, ω-diallyl PEG (A-PEG-A) may be prepared by reacting α, ω-dihydroxy PEG with excess allyl halide over NaOH powder in toluene as known in the art.

Under these conditions the hydroxyl group of PEG is ionized and the corresponding alkoxide displaces the halide, preferably bromide. This reaction is schematically shown in Scheme I.

Scheme I

To synthesize α, ω-diallyl PIB (A-PIB-A), living carbocationic polymerization of isobutylene is commenced by the use of the known dicumyl chloride/$TiCl_4$/DMA/−80° C. system followed by end-quenching with allyltrimethylsilane (ATMS) as is well known in the art. The resulting terminal allyl functionality can be quantitatively analyzed to insure that allyl-terminated PIB is obtained. This reaction is shown in Scheme II.

Scheme II

-continued

The remaining polysiloxane molecules and polymer segments, such as $D_5H$ and V-PDMS-V may be purchased commercially from chemical manufacturers such as Gelest Chemicals and used as received.

Once the desired allyl-terminated or vinyl-terminated polysiloxane segments and siloxane ($D_5H$) molecules are obtained, they can be linked by hydrosilation to A-PIB-A and A-PEG-A, thereby forming the multicomponent networks. One manner of conducting the hydrosilation reaction is shown in Scheme III and may be described as follows.

Scheme III where R = PIB or PEG moiety.

As shown, the synthesis was accomplished by hydrosilation of the allyl-terminated PEGs, PIBs and PDMSs with pentamethylcyclopentasiloxane ($D_5H$). Effective amounts of the three components for forming the desired network were dissolved in toluene, a good solvent for PIB, siloxane and PEG segments. Appropriate and effective amounts of $D_5H$ and Karstedt's catalyst (i.e., Pt with 1,3-divinyltetramethyldisiloxane) (about 10 μL) were then added and the charge stirred for a set period of time. Effective amounts of the ingredients will depend largely on the stoichiometry ratio of the segments and the crosslinking agent, which is controlled so that the A-PEG-A, A-PIB-A and V-PDMS-V segments are completely crosslinked as desired. Once a viscous fluid is obtained, the solvent may be removed by evaporation.

Leaving a fraction of the SiH functions unreacted will allow for subsequent controlled crosslinking by water. This crosslinking with water is a condensation reaction and permits bonding of the SiH groups to each other by converting them to SiOH groups and subsequently forming Si—O—Si groups. A schematic representation of this reaction is set forth in Scheme IV below.

Scheme IV

Importantly, it has been found that, unlike other networks, the pore size and the degree of water swelling of these new networks can be controlled precisely by controlling the molecular weight of the hydrophilic chain segments. The strength of these novel networks can be controlled by the length of the hydrophobic/lipophilic segments and by the crosslink density. Oxygen transport through these networks can occur by either of two channels—first, by specific channels provided by the continuous polysiloxane (PDMS and/or $D_5H$) domains, or second, by the continuous water-swollen PEG channels/domains through which oxygen dissolved in water can permeate. Therefore, by precisely controlling the amounts (wt %) and lengths of the segments in the membranes, strength, degree of swelling, pore size and oxygen permeability of the networks can be controlled.

Generally, it has been found that maximizing swelling and mechanical properties, while providing continuous channels/domains through which oxygen can permeate, can be attained with the described multicomponent networks. More particularly, it has been found that good mechanical properties and a high degree of swelling can be obtained by the use of PEG those concentration in the network is between about 20 weight percent and about 50 weight percent.

In another embodiment of the present invention, the multicomponent network may include a plurality of ditelechelic, allyl-terminated poly(ethylene glycol) segments and a plurality of ditelechelic, allyl-terminated poly(isobutylene) segments linked to a plurality of crosslinking agents, namely a siloxane compound having two or more SiH moieties such as $D_5H$. It will be appreciated that, where $D_5H$ is used as the crosslinking agent, there will be five SiH groups.

It will be understood that the allyl-terminated PEGs and allyl-terminated PIBs can be prepared in the same manner as described hereinabove (see Schemes I and II) for the previously disclosed embodiment. Moreover, these networks can be synthesized by linking the multifunctional polymer segments, i.e., allyl terminated segments, with the siloxane crosslinking agents having at least two SiH groups, via hydrosilation (see Scheme III) and, if desired, condensation (see Scheme IV). The stoichiometric ratios and molecular weights, as well as the molecular weight distributions of the ingredients, may be changed. The ability to control the molecular weights and molecular weight distributions, as well as the polymer segments/domains, is seen as a significant improvement in the art in enabling the membranes to maintain excellent strength and a high degree of swellability, while now adding oxygen permeability to the list of controllable characteristics.

In still another embodiment, the multicomponent network may include a plurality of ditelechelic, allyl-terminated poly(ethylene glycol) segments and a plurality of ditelechelic, vinyl-terminated PDMS segments linked to a plurality of crosslinking agents, namely a siloxane compound having two or more SiH groups such as $D_5H$. It will be noted that this embodiment is devoid of PIB.

Synthesis of this embodiment of multicomponent networks may be undertaken in the same manner as described above in Schemes I, III and IV. It will be appreciated, however, that eliminating PIB as a segment/domain of the membrane also eliminates a hydrophobic/lipophilic domain of the composition. Nevertheless, it has been found that the siloxanes (both PDMS and $D_5H$) are sufficiently hydrophobic/lipophilic so that in conjunction with PEG, the membranes are triphilic in nature.

In yet another embodiment, it will be appreciated that the mulitcomponent network may be formed from only two components, namely allyl-terminated PEG crosslinked with siloxane molecules containing at least two SiH groups (preferably $D_5H$). In this unique embodiment, the network is again specifically devoid of any PIB.

Again, the physical and chemical characteristics of each of these networks of the present invention can be controlled and changed by adding or removing the amount of each polymer used in the composition, or by changing the molecular weight of the segments.

Thus, it should be evident that the present invention's multicomponent networks, comprising controlled, known number average molecular weight polymer segments, can be synthesized by linking, or more particularly, endlinking the end-functionalized polymer segments with well-defined multifunctional polysiloxanes having SiH moieties via hydrosilation. The resulting polymeric compositions have significant ramifications in biomedical applications as well as being elastomeric and insoluble in solvents. Because the polymer segments and polysiloxane molecules are well-defined and easily characterized prior to crosslinking, polymeric compositions comprising desired mechanical and/or chemical properties of any of these components can be readily obtained.

In order to demonstrate practice of the present invention, the following experiments were carried out. The following are illustrative of the nature of the invention only, and should not necessarily be construed as limiting the scope of the invention. The scope of the invention resides in the invention as hereinafter claimed.

EXAMPLE 1

Initially, the synthesis of tricomponent, PEG/PIB/$D_5H$ triphilic networks were accomplished. Such networks are characterized as having hydrophilic domains comprising the poly(ethylene glycol) segments, lipophilic/olephilic domains comprising blocks of polyisobutylene (PIB), and oxyphilic domains which, at the same time function as crosslinking sites as well, comprising pentamethylcyclopentasiloxane ($D_5H$). An efficient and simple method for the synthesis of these tricomponent membranes is reported and these networks have been characterized in regards to overall composition, microstructure and permeability.

All reagents and solvents used were of reagent grade or higher purity. Hydrochloric acid, sodium sulfate, magnesium sulfate, hexanes, tetrahydrofuran, methylene chloride, methanol, acetone and toluene were obtained from Fischer Scientific. Potassium hydroxide, $TiCl_4$, dimethylacetamide (DMA), di-tert-butylpyridine (DtBP), allyltrimethylsilane (ATMS), allyl bromide, sodium hydroxide and α, ω-dihydroxy PEG were obtained from Aldrich and were used as received. Pentamethylcyclopentasiloxane ($D_5H$) and Karstedt's catalyst (Pt with 1,3-divinyltetramethyldisiloxane in xylene solution) were from Gelest Chemicals and used as received. Isobutylene (IB (CP grade)) and methyl chloride ($CH_3Cl$) were obtained from Matheson and dried by passing the gases through columns packed with activated BaO/Drierite/$CaCl_2$ and molecular sieves, and condensed under $N_2$. The synthesis of 1,4-bis(2-chloro-2-propyl)benzene (dicumyl chloride, DcumCl) is well known in the art.

First, the A-PEG-A and A-PIB-A polymer segments were synthesized as known in the art. Specifically, α, ω-diallyl PEG (A-PEG-A) was prepared by reacting α, ω-dihydroxy PEG (Mn=4600 g/mol) with excess allyl bromide over NaOH powder in toluene for 12 hours at ~45° C. A more detailed description of this procedure is set forth by Kurian, P.; Zschoche, S.; Kennedy J. P. in J Polym Sci A: Polym Chem 2000, 38, 3200, and references therein, the disclosure of which is incorporated herein by reference. Under these conditions the hydroxyl group of PEG was ionized and the corresponding alkoxide displaced the bromide. The liquid was decanted and the solvent removed by rotary evaporator. The product was then dissolved in water, extracted with $CH_2Cl_2$ four times, dried over $Na_2SO_4$, and the solvent was removed by a rotary evaporator. The resulting white powder was then recrystallized in diethyl ether and dried under vacuum. The disappearance of hydroxyl groups was monitored by FTIR spectroscopy. After ~12 hours, the absorption band corresponding to the hydroxyl group in the FTIR spectrum at ~3500 $cm^{-1}$ disappeared indicating that allyl end functionalized PEG had been obtained.

$^1H$ and $^{13}C$ NMR spectroscopies also indicate quantitative conversions of terminal hydroxyls to allyl groups. The resonance at 2.6 ppm associated with OH groups disappeared, while the resonances at 5.1–5.3 and 5.8–5.9 ppm associated with the allyl groups appeared. Characterization by $^{13}C$ NMR spectroscopy also prove quantitative allylation. The resonance at ~62 ppm indicating —$\underline{C}H_2OH$ has disappeared while those showing the presence of —$CH_2$—$\underline{C}H$=$\underline{C}H_2$ appeared at ~116 ppm and ~135 ppm, respectively.

Next, α, ω-diallyl PIB (A-PIB-A) was synthesized by living carbocationic polymerization of isobutylene by the DcumCl/$TiCl_4$/DMA/−80° C. system followed by end-quenching with ATMS. A more detailed description of this procedure is set forth by Kurian, P.; Zschoche, S.; Kennedy J. P. in J Polym Sci A: Polym Chem 2000, 38, 3200, and references therein, the disclosure of which is incorporated herein by reference. According to NMR spectroscopy and GPC characterization, the terminal allyl functionality was quantitative, and $M_n$=10,000 and $M_w/M_n$=1.08.

The remaining polysiloxane molecules and polymer segments, $D_5H$ and V-PDMS-V (28,500 g/mol) respectively, may be purchased from Gelest Chemicals and used as received.

The desired prepolymer segments and $D_5H$ were linked by hydrosilation. It will be appreciated that Schemes III and IV above result in the synthesis of new multicomponent polymeric compositions containing at least PEG. From these schemes, it is evident that unlike other networks the pore size of this network can be controlled precisely by controlling the molecular weight and molecular weight distribution of the hydrophilic chain segment. The PEG segment used here was 4600 g/mol with a molecular weight distribution of 1.06.

Network syntheses were done as follows: The appropriate amounts of α, ω-diallyl-terminated PIB and PEG were dissolved in toluene and added to a 300 mL round bottom flask equipped with a magnetic stir bar. This flask was placed in an oil bath kept at 100° C. Under constant stirring appropriate amounts of $D_5H$ and the Karstedt's catalyst (~10 μL) were added to the flask and the reaction was left undisturbed for the next 36 hours. After the disappearance of the allyl groups by FTIR spectroscopy at 1640 $cm^{-1}$, a few drops of water were introduced dropwise to the stirred solution. The charge was stirred for another 12 hours until the consumption of almost all of the SiH groups. A transparent highly viscous fluid was obtained. Films were cast by pouring this fluid into Teflon or glass molds and the solvent was evaporated slowly at room temperature. The crosslinking of $D_5H$ was completed at room temperature with ambient humidity and the product was dried under reduced pressure. Unreacted materials were removed by sequential extractions with hexanes and water.

Table I hereinbelow specifies the relative amounts of the ingredients used. The following symbolism has been used in this disclosure to identify some networks. $PIB(M_{n,PIB})$-PEG $(M_{n,PEG})$, where $M_{n,PEG}$ and $M_{n,PIB}$ are the number average molecular weights of the PEG and PIB segments×$10^3$. For example, $PIB(10)/PEG(4.6)/D_5H$ stands for a network consisting of a PIB block of 10,000 g/mol and a PEG block of 4600 g/mol linked to pentamethylcyclopentasiloxane ($D_5H$).

To characterize the components, molecular weights and molecular weight distributions ($M_w/M_n$) of PIB were determined by a Waters GPC instrument equipped with a series of five μ-styragel columns (100, 500, $10^3$, $10^4$, and $10^5$, Å) calibrated with narrow MWD PIB standards, a Waters 420 differential refractometer (DRI), a Waters 2487 dual UV detector; and a Wyatt Technology Minidawn Laser-Light Scattering (LLS) detector (Wyatt Technology Corporation, Santa Barbara, Calif.). The flow rate was 1 mL of THF/min. Astra and Chromperfect softwares were used for data analysis. Details of the procedure are well known.

Fourier Transform Infrared (FTIR) spectroscopy (FTIR-8300, Shimadzu, instrument Kyoto Japan) was used to confirm the conversion of α, ω-dihydroxy PEG to α, ω-diallyl PEG and the disappearance of allyl groups and SiH groups during the network synthesis.

$^1$H NMR (Varian Gemini-300 or Varian Unityplus-750 Spectrometer) spectroscopy was used to quantitate allyl functionalities. Sample concentration was 40 mg/0.75 mL in $CDCl_3$ or $CD_2Cl_2$.

Differential Scanning Calorimetry (DSC) was performed by a DuPont 2100 Thermal Analyzer under nitrogen atmosphere with a heating rate of 10° C./min. The melting point ($T_m$) was defined as the minimum of the DSC endotherm. Thermogravimetric analysis (TGA) was obtained by using a DuPont 951 instrument, under nitrogen atmosphere at the heating rate of 10° C./min.

Initially, samples were removed and examined by FTIR spectroscopy for the disappearance of allyl signals at 1640 $cm^{-1}$ and the SiH signals at 1240 $cm^{-1}$. Reactions other than hydrosilation will also consume silicone hydride. The hydrolysis of silicone hydride to silanol takes place in the presence of platinum catalyst and minute amounts of water as is readily known in the art. It is also well known in the art that silanols can easily undergo self-condensation to give the corresponding siloxane. This second step was accomplished by adding few drops of water into the charge upon completion of hydrosilation. Hydrolysis took place immediately with the addition of moisture, which was evident from the evolution of hydrogen gas from the charge.

Figure 1:
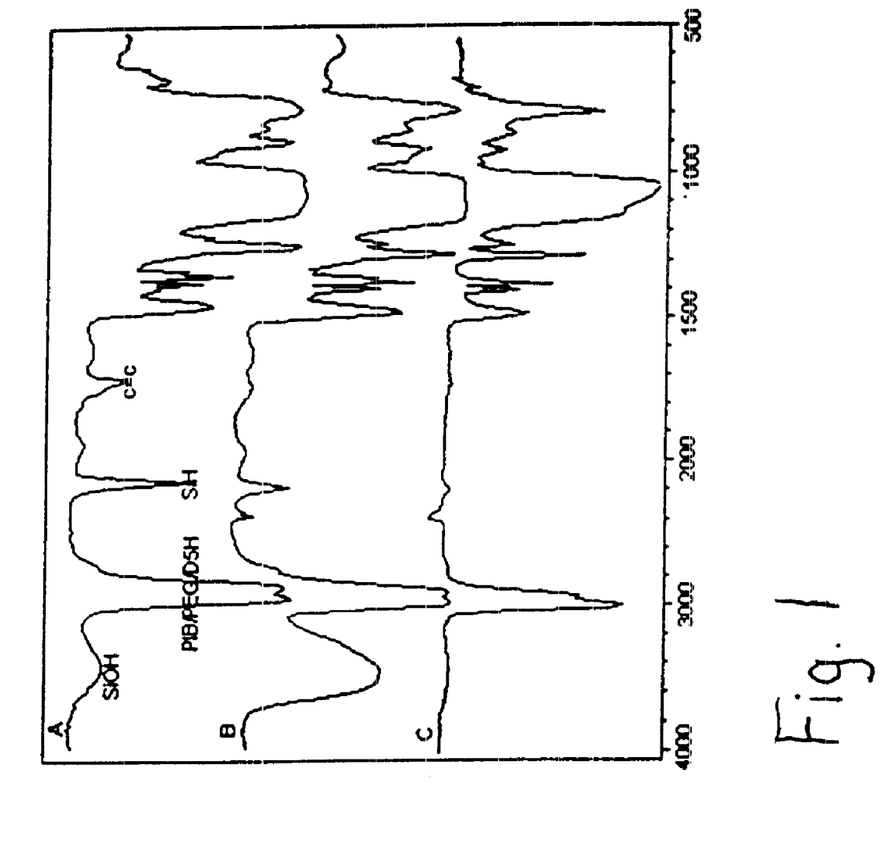
FIG. 1 is a FTIR spectrum of a representative PEG/PIB/siloxane network during formation at three separate points in time, Runs A, B, and C.

The excess SiH groups allowed for carrying out the reaction under not extremely anhydrous conditions. Samples were removed and examined by FTIR spectroscopy for the disappearance of allyl signals at 1640 $cm^{-1}$ and the SiH signals at 2140 $cm^{-1}$. FIG. 1 shows three FTIR spectrums of a representative network. Absorptions at 1360–1490 and 1800–3000 $cm^{-1}$ are due to the —$CH_3$ and —$CH_2$— stretching vibrations and the —$CH_3$, —$CH_2$— bending vibrations from the PIB, PEG and $D_5H$ segments. The broad absorption band at 3500 $cm^{-1}$ is due to OH stretching from the silanol and, as is known in the art, the sharp absorptions band at 2140 $cm^{-1}$ is from the SiH stretching. Reactions other than hydrosilation will also consume silicone hydride. The hydrolysis of silicone hydride to silanol takes place in the presence of platinum catalyst and minute amounts of water as is well known in the art. FIG. 1 shows some silanol groups at the beginning of the reaction (Run A). Without being bound by theory, it is believed this is from the hydrolysis of the SiH groups initiated by the moisture present initially in the system. Indeed, the hydrosilation effected the disappearance of the absorption at 1640 $cm^{-1}$ associated with allyl termini and the absorption at 2140 $cm^{-1}$ associated with the SiH group were reduced in its intensity. The absence of absorption band at 1640 $cm^{-1}$ (C=C stretch) is evidence that hydrosilation was carried to completion. Upon addition of moisture to the system, the SiH band further reduces in size as the Si—OH stretching band increases in its intensity (see FIG. 1—Run B). As the reaction proceeds to the end, the absorption band from silanol also diminished in size and finally disappears completely as shown in FIG. 1, Run C. Model reactions carried out with pentamethylcyclopentasiloxane in toluene in the presence of catalyst showed complete consumption of SiH and the formation of Si—O—Si linkages with the introduction of moisture.

To confirm the hydrosylation efficiency, the amount of extractables were determined after casting films by determining the amount of water- and hexane-soluble fractions. The dried samples were weighed and immersed in hexane, with was decanted and replaced periodically at room temperature for a minimum of 72 hours. After 3 days the networks were dried under reduced pressure. The same procedure was repeated with water. Extracting the networks with water removes the unreacted/unlinked hydrophilic (PEG) segments and the hexane extraction will remove the unreacted/unlinked hydrophobic moieties ($D_5H$, PIB).

TABLE I

Swelling and Extraction Data of Representative PEG/PIB/$D_5H$ Tricomponent Networks

| PIB(10 K)PEG(4.6 K)$D_5H$ Composition (Wt. %) | $d_{sw}$ | Water Extract (%) | Hexane Extract (%) |
|---|---|---|---|
| 1  67/0/33 | 0.05 | 0.03 | 3.22 |
| 2  40/10/50 | 0.12 | 0.75 | 1.47 |
| 3  46/11/43 | 0.46 | 0.50 | 1.61 |
| 4  53/13/33 | 0.43 | 0.27 | 1.27 |
| 5  47/20/33 | 0.38 | 0.10 | 4.56 |
| 6  25/25/50 | 0.77 | 0.79 | 3.67 |
| 7  40/27/33 | 0.78 | 1.15 | 2.85 |
| 8  20/30/50 | 0.92 | 0.91 | 2.81 |
| 9  48/32/20 | 0.85 | 1.05 | 2.39 |
| 10 33/33/33 | 0.99 | 0.67 | 1.82 |
| 11 20/40/40 | 1.04 | 1.66 | 1.48 |

Table I summarizes the results of water and hexane extractions along with the swelling characteristics of representative samples in water ($d_{sw}$). Sample 1 contained no hydrophilic (PEG) segments and, therefore, the water extractable fraction is zero. All the networks studied showed much less than 2% water soluble extractables which indicates that hydrosilation was nearly quantitative and that incompatibility between these polymer segments did not inhibit the reaction. Hexane extraction showed somewhat higher weight % extractables than water, because hexane should remove all unreacted PIB and $D_5H$. However, all the results showed less than 5% weight loss which indicates satisfactory crosslinking.

Next, the swelling behavior of our networks in water was investigated. Swelling studies were carried out at room temperature by immersing samples in distilled water for 24 hours. Equilibrium swelling was reached, as indicated by a further absence of swelling after 24 hours. The degree of swelling, $d_{sw}$, was calculated by means well known in the art. All networks swelled in water except for network 1 (Sample 1, Table I) which did not contain the hydrophilic segments (PEG).

The goal was to maximize swelling while maintaining the mechanical properties. The networks with more than 50% (weight) PEG were weak mechanically, while networks with less than 20% hydrophilic segments showed low degree of swelling. While quantitative swelling measurements were not carried out in hexane, visual observations determined that the membranes do swell in that solvent and that hexane readily diffuses through select sheets of membranes. Accordingly, the membranes contain continuous lipophilic domains.

Studies also showed that these networks are transparent to oxygen as well. In fact, even Sample 1 in Table I showed transparency to oxygen, which suggests that the permeability of oxygen is not only through the hydrophilic segments, but the built-in channels (i.e., provided by $D_5H$) are in fact allowing the permeation of oxygen. Generally, it has been found that about 33% siloxane in the membrane gives rise to continuous domains/channels through which oxygen can permeate. This evidence along with the permeability to water and hexane proves that there is tricontinuity (triphilicity) in this network.

Thermal properties of the networks were also studied and are shown in Table II as collected from the DSC measurements. Due to incompatibility between the segments, the tricomponent networks were expected to exhibit phase-separated morphology. According to DSC data, the thermal behavior of all three components has changed considerably after network formation. Specifically, the $T_m$ of PEG shifted to ~55° C. ($T_{m, PEG\ 4.5\ k}$=63° C.), the $T_g$ of PIB increased to ~-60° C. ($T_{g, PIB\ 10\ k}$=73° C.), and instead of a melting transition for $D_5H$ ($T_{m, D5H}$=-136° C.), a glass transition at ~-145° C. was observed. These changes in thermal transitions are due to cross-linking. The $T_g$ of PIB starting segment was -73° C., the $D_5H$ and PEG showed a melting endotherm at -136° C. and 63° C. respectively. The thermal behavior of all components changed considerably after the formation of the networks and the change was dependent on the network compositions. This was expected since the mobility and the packing of the segments are restricted by the crosslinks in the networks. The starting PEG segment showed a sharp melting peak but the melting endotherm associated with PEG segment in the networks showed a broad transition at 10–12° C. lower. As the weight percent of PEG increased in the networks the transition became sharper. This phenomenon was explained in the prior art by Merrill and co-workers. According to these authors, as the siloxane content increases, the degree of entanglements increases and the PEG crystallization is inhibited. The siloxane segments essentially act as a diluent. Evidently crystallization of the PEG segment in the network is restricted and the melting point of the PEG segment is reduced to about 50° C.

TABLE II

DSC Data for the Tricomponent Networks

| Sample | Composition | $T_gD_5H$(° C.) | $T_gPIB$(° C.) | $T_mPEG$(° C.) |
|---|---|---|---|---|
| 1 | 25/25/50 | −140 | −63 | 50 |
| 2 | 47/20/33 | −153 | −60 | 50 |
| 3 | 64/16/20 | −145 | −61 | 51 |
| 4 | 40/10/50 | −135 | −63 | 50 |
| 5 | 20/30/5O | −143 | −53 | 49 |
| 6 | 33/33/33 | −147 | −56 | 48 |

Figure 2:
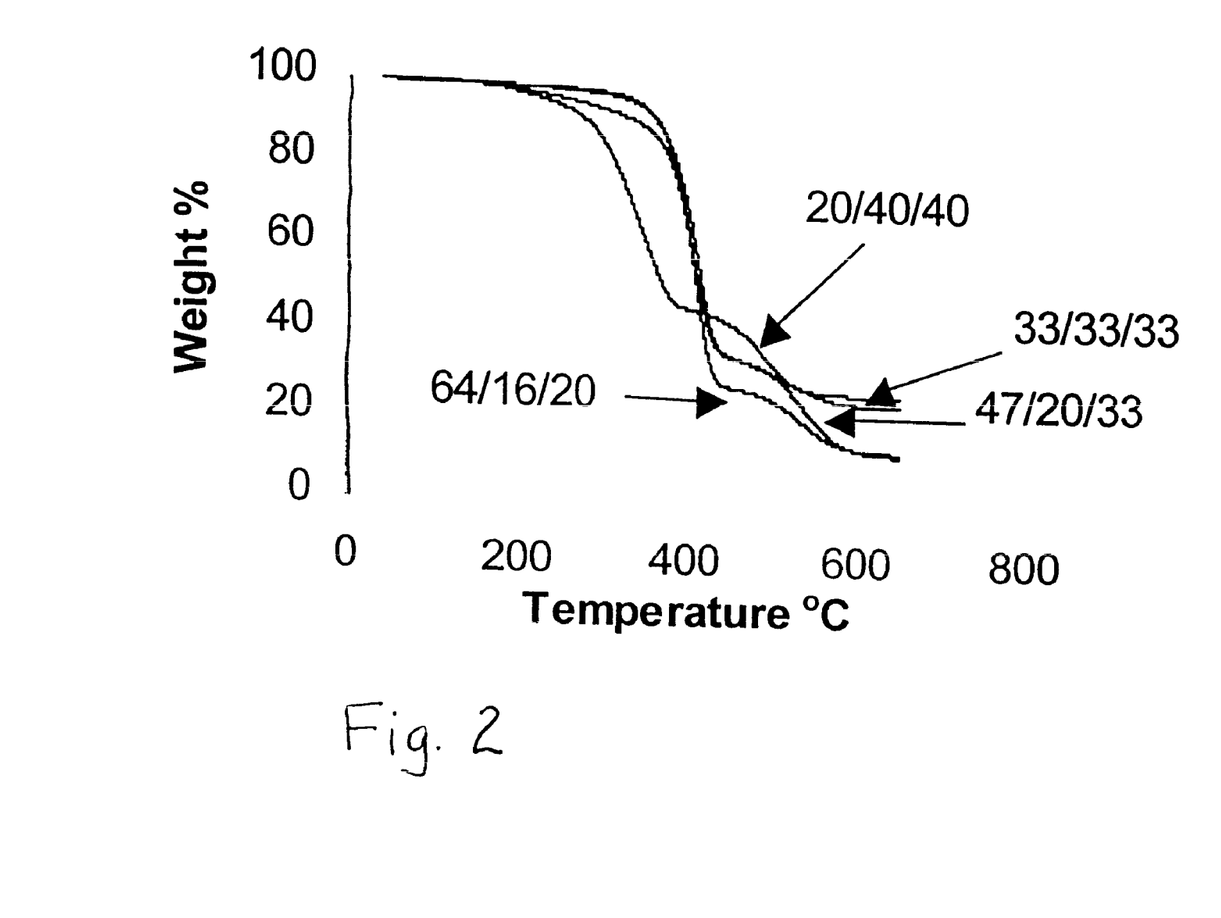
FIG. 2 is a representative graph of Temperature versus Weight Percentage demonstrating the thermal degradation of the multicomponent networks.

The thermal stability of the networks was investigated in nitrogen. The result shows two step degradations. All samples tested showed thermal stability up to 300° C., which is more than enough for the heat sterilization. The degradation depended on the network compositions (see FIG. 2). Networks with higher weight percent of PEG started degradation earlier. PIB and PEG decomposed completely at ~425° C. The siloxane segment remained stable above 700° C. The amount of char remained from decomposition in nitrogen increased with siloxane weight percent in the sample. Siloxane segments are known to form $SiO_2$ upon burning, preventing further combustion beyond the $SiO_2$ char layer; this is well known in the art.

EXAMPLE 2

In a second set of experiments, other multicomponent networks were synthesized. More particularly, polymers were synthesized as reported in Table III with the appropriate amounts of A-PIB-A, A-PEG-A, V-PDMS-V, and $D_5H$. All the ingredients were dissolved in toluene and placed in a 300 mL round bottom flask equipped with a magnetic stir bar in an oil bath at 100° C. Appropriate amounts of $D_5H$ and Karstedt's catalyst (~10 μL) were added and the charge was stirred for 24 hours. Table III specifies the relative amounts of the ingredients used to make some of these networks. A transparent viscous fluid was obtained. Films were cast by pouring this fluid into a Teflon mold (9 cm×14 cm) and evaporating the toluene at room temperature.

The schemes shown above demonstrate the overall synthesis strategy used to prepare the various networks with near quantitative conversion. Synthesis of the first generation membranes involved A-PIB-A and A-PEG-A crosslinked by $D_5H$; that of the second generation was performed with A-PIB-A and A-PEG-A, V-PDMS-V crosslinked by $D_5H$; and that of the third generation was performed by the use of A-PEG-A and V-PDMS-V crosslinked by $D_5H$. Syntheses were accomplished by random cohydrosilation of A-PIB-A, A-PEG-A, and/or V-PDMS-V by $D_5H$ in toluene, a good solvent for all the ingredients. The stoichiometry of the network ingredients (see Table III) was controlled so that the PIB, PEG and PDMS segments should be completely crosslinked by $D_5H$, however, leaving a fraction of the SiH functions in this hydrosilating agent unreacted for subsequent controlled crosslinking by water. The segments' compatibility tests confirmed that the syntheses were not prevented by massive phase separation in solution. The details of these studies have been described in the art. Unreacted materials were removed by sequential extractions with hexanes and water.

TABLE III

|  | Composition (wt %) | Water sol (%) | Hexane sol (%) | $d_{sw}$ | Tensile strength* (Mpa) | Elongation* (%) |
|---|---|---|---|---|---|---|
| Generation I | PIB (10k)/PEG (4.6k)/D$_5$H | | | | | |
| | 67/0/33 | 0.03 | 3.22 | 0.05 | | |
| | 40/10/50 | 0.75 | 1.47 | 0.12 | | |
| | 46/11/43 | 0.50 | 1.61 | 0.38 | | |
| | 53/13/33 | 0.27 | 1.27 | 0.43 | | |
| | 47/20/33 | 0.10 | 4.10 | 0.46 | 1.3 | 260 |
| | 25/25/50 | 0.79 | 3.67 | 0.77 | 1.9 | 80 |
| | 40/27/33 | 1.15 | 2.85 | 0.78 | | |
| | 20/30/50 | 0.91 | 2.81 | 0.92 | | |
| | 48/32/20 | 1.05 | 2.39 | 0.85 | | |
| | 33/33/33 | 0.67 | 1.82 | 0.99 | 1.7 | |
| | 20/40/40 | 1.66 | 1.48 | 1.04 | | |
| Generation II | PIB (10k)/PEG (4.6k)/PDMS (28.5k)/D$_5$H | | | | | |
| | 25/25/25/25 | | | | 5.3 | 500 |
| | 20/18/36/26 | | | | | |
| Generation III | PEG (4.6k)/PDMS (28.5k)/D$_5$H | | | | | |
| | 33/33/33 | | | | 4.3 | 308 |
| | 25/25/50 | | | | | |
| | 50/25/25 | | | | | |

From Schemes III and IV and Table III, it is evident that unlike other networks the pore size and the degree of water swelling of our networks can be controlled precisely by controlling the molecular weight and molecular weight distribution of the hydrophilic chain segment. The strength of these networks can be controlled by the hydrophobic/lipophilic segments and by the crosslink density.

Oxygen transport through these networks can occur by two channels: (1) by $O_2$-specific channels provided by the continuous polysiloxane (PDMS and $D_5H$) domains, and (2) continuous water-swollen PEG channels/domains through which $O_2$ dissolved in water can permeate. Therefore, by precisely controlling the amounts (wt. %) of segments, the strength, degree of swelling, pore size, and oxygen permeability of these networks can be controlled.

Particular attention is being given to characterize the $O_2$ permeability of these membranes. In these investigations, oxygen transport through water-swollen tricomponent membranes is determined by the use of $O_2$ electrodes. Importantly, Sample 1 in Table III, i.e., a membrane that contains only PIB and $D_5H$ (both lipophilic) segments, was found to be highly permeable to $O_2$. Evidently, about 33% $D_5H$ in the membrane gives rise to continuous domains/channels through which $O_2$ can permeate.

It was further confirmed that networks with more than 50% PEG were weak whereas those with less than 20% PEG show a low degree of swelling. Good mechanical properties and high degree of swelling were obtained in the PEG= 20–50% range.

Network formation and the extent of crosslinking were studied and confirmed by FTIR spectroscopy. The disappearance of the allyl and SiH signals (at 1640 cm$^{-1}$ and 2140 cm$^{-1}$, respectively), were followed as a function of time. Thus samples were removed from the charge and examined for the disappearance of these signals. The absence of the absorption at 1640 cm$^{-1}$ (C=C stretch) was evidence for essentially complete hydrosilation.

Thus, it should be evident that the multicomponent networks of the present invention are highly effective in producing triphilic compositions. While the invention with respect to tricomponent networks is particularly suited for PEG, PIB and $D_5H$, it is not necessarily limited thereto, it being understood that other multifunctional siloxane compounds, particularly those allyl or vinyl-terminated and capable of undergoing hydrosilation could also be utilized. Further, the use of a cyclosiloxane such as $D_5H$ with respect to the synthesis of the networks should not necessarily be limited to pentamethylcyclopentasiloxane, it being understood that other linear siloxanes or cyclosiloxanes having two or more SiH moieties could also be employed.

Moreover, recent studies have confirmed the biocompatibility of the networks. In vivo tests have proven successful. Thus, the biomaterial of the present invention is believed to be suitable for use as an implantable biological device.

Based upon the foregoing disclosure, it should now be apparent that the use of the components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the described invention.

What is claimed is:

1. A multicomponent network comprising the reaction product of at least a plurality of multifunctional, allyl terminated polyethylene glycols linked to a plurality of multifunctional siloxane compounds having at least two SiH moieties for each siloxane compound, wherein the reaction product further includes at least a plurality of multifunctional, allyl-terminated polyisobutylenes linked to the plurality of multifunctional siloxane compounds having at least two SiH moieties for each siloxane compound.

2. A multicomponent network comprising the reaction product of at least a plurality of multifunctional, allyl terminated polyethylene glycols linked to a plurality of multifunctional siloxane compounds having at least two SiH moieties for each siloxane compound, wherein the reaction product further includes at least a plurality of multifunctional, vinyl-terminated polydimethylsiloxanes linked to the plurality of multifunctional siloxane compounds having at least two SiH moieties for each siloxane compound.

3. The multicomponent network of claim 1, wherein the reaction product further includes at least a plurality of multifunctional, vinyl-terminated polydimethylsiloxanes linked to the plurality of multifunctional siloxane compounds having at least two SiH moieties for each siloxane compounds.

4. The multicomponent network of claim 1, wherein said siloxane compounds are cyclosiloxanes.

5. The multicomponent network of claim 4, wherein said siloxane compounds are pentamethylcyclopentasiloxane.

6. The multicomponent network of claim 1, wherein the allyl terminated polyethylene glycols are ditelechelic.

7. The multicomponent network of claim 1, wherein the allyl terminated polyisobutylenes are ditelechelic.

8. The multicomponent network of claim 2, wherein the vinyl terminated polydimethylsiloxanes are ditelechelic.

9. The multicomponent network of claim 2, wherein the reaction product is devoid of polyisobutylenes.

10. The multicomponent network of claim 1, wherein the reaction product is hydrophilic, lipophilic, and oxyphilic.

11. The multicomponent network of claim 2, wherein the reaction product is hydrophilic, lipophilic, and oxyphilic.

12. The multicomponent network of claim 3, wherein the reaction product is hydrophilic, lipophilic, and oxyphilic.

13. A multicomponent network comprising the hydrosilation reaction product of a plurality of ditelechelic, allyl-terminated polyethylene glycols, a plurality of ditelechelic, allyl-terminated polyisobutylenes, and a plurality of ditelechelic vinyl-terminated polydimethylsiloxanes, each linked to a plurality of pentamethylcyclopentasiloxanes having five SiH moieties for each of the pentamethylcyclopentasiloxanes.

14. The multicomponent network of claim 2, wherein said siloxane compounds are cyclosiloxanes.

15. The multicomponent network of claim 14, wherein said siloxane compounds are pentamethylcyclopentasiloxane.

16. The multicomponent network of claim 3, wherein the allyl terminated polyethylene glycols are ditelechelic.

* * * * *

UNITED STATES PATENT AND TRADEMARK OFFICE
CERTIFICATE OF CORRECTION

PATENT NO.     : 6,528,584 B2
DATED          : March 4, 2003
INVENTOR(S)    : Kennedy et al.

It is certified that error appears in the above-identified patent and that said Letters Patent is hereby corrected as shown below:

Column 18,
Line 14, "claim 3" should read -- claim 2 --.

Signed and Sealed this

Nineteenth Day of August, 2003

JAMES E. ROGAN
*Director of the United States Patent and Trademark Office*